(12) United States Patent
Doshida

(10) Patent No.: US 11,567,422 B2
(45) Date of Patent: Jan. 31, 2023

(54) IMAGE READING APPARATUS AND IMAGE FORMING APPARATUS

(71) Applicant: CANON KABUSHIKI KAISHA, Tokyo (JP)

(72) Inventor: Takaaki Doshida, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/539,799

(22) Filed: Dec. 1, 2021

(65) Prior Publication Data
US 2022/0179334 A1    Jun. 9, 2022

(30) Foreign Application Priority Data
Dec. 8, 2020    (JP) .............................. JP2020-203548

(51) Int. Cl.
*G03G 15/00* (2006.01)
*G03G 15/043* (2006.01)
*H04N 1/00* (2006.01)

(52) U.S. Cl.
CPC ....... *G03G 15/043* (2013.01); *G03G 15/5041* (2013.01); *G03G 15/5062* (2013.01); *H04N 1/00018* (2013.01); *H04N 2201/0081* (2013.01)

(58) Field of Classification Search
CPC ........... G03G 15/0121; G03G 15/0131; G03G 15/043; G03G 15/5041; G03G 15/5058; G03G 15/5062; H04N 1/00018
See application file for complete search history.

(56) References Cited

U.S. PATENT DOCUMENTS

| | | | |
|---|---|---|---|
| 8,526,835 B2 * | 9/2013 | Lee ................... | G03G 15/0131 399/49 |
| 9,417,566 B2 * | 8/2016 | Shibuya ............. | G03G 15/1675 |
| 2010/0176884 A1 | 7/2010 | Wei | |

\* cited by examiner

*Primary Examiner* — Hoang X Ngo
(74) *Attorney, Agent, or Firm* — Canon U.S.A., Inc. IP Division

(57) ABSTRACT

An image reading apparatus includes a conveyance roller to convey a sheet, a light source to illuminate an image on the sheet while being moved in a predetermined direction above the conveyed sheet, a reading sensor to read the image on the sheet while being moved in the predetermined direction above the conveyed sheet, and a controller. The controller controls the reading sensor to read a first image for generating a color profile on a first sheet after the light source emits light for a duration of a first time. The controller controls the reading sensor to read a second image for detecting density unevenness in a main scanning direction of the image forming apparatus on a second sheet after the light source emits light for a duration of a second time shorter than the first time.

20 Claims, 11 Drawing Sheets

| C | M | Y | K | L* | a* | b* |
|---|---|---|---|----|----|----|
| 100 | 0 | 0 | 0 | 91 | -48 | -14 |
| 0 | 100 | 0 | 0 | 60 | 98 | -61 |
| 0 | 0 | 100 | 0 | 97 | -22 | 94 |
| 0 | 0 | 0 | 100 | 0 | 0 | 0 |
| 0 | 100 | 100 | 0 | 53 | 80 | 67 |
| 55 | 10 | 85 | 0 | 82 | -62 | 74 |
| ⋮ | ⋮ | ⋮ | ⋮ | ⋮ | ⋮ | ⋮ |

IMAGE READING APPARATUS AND IMAGE FORMING APPARATUS

BACKGROUND

Field of the Disclosure

The aspect of embodiments relates to control of preliminary light emission of a light emission unit used to measure images on sheets.

Description of the Related Art

Properties used to evaluate the quality of images from image forming apparatuses include granularity, in-plane uniformity, character quality, color reproducibility and, among them, color reproducibility is important. Color reproducibility is a capability to output an identical color to the color on the printing original document. Recent image forming apparatuses include an optical sensor mounted on a conveyance path where sheets are conveyed to control the density and the color of the image based on the result of measuring a measurement image fixed on a sheet. The light emitting unit heats up immediately after the light emitting unit starts emitting light, which can cause unstable light emission, degrading the measurement accuracy of measurement images.

United States Patent Publication Application No. 2017/0176884 discusses an image forming apparatus that causes the light emitting unit to emit light before measuring a measurement image and that measures the measurement image after the temperature of the sensor sufficiently increases due to the heat from the light emitting unit. That is called preliminary light emission. A sufficiently increased temperature of the sensor causes reduced variations in temperature, which allows measurement of measurement images with high accuracy.

SUMMARY OF THE DISCLOSURE

According to an aspect of the embodiments, an image reading apparatus configured to read an image on a sheet discharged from an image forming apparatus includes a conveyance roller configured to convey the sheet to a conveyance path, a light source configured to illuminate the image on the sheet while being moved in a predetermined direction above the sheet conveyed by the conveyance roller, the predetermined direction being different from a conveyance direction in which the sheet is conveyed by the conveyance roller, a reading sensor configured to read the image on the sheet while being moved in the predetermined direction above the sheet conveyed by the conveyance roller, and a controller configured to, in a case where the reading sensor reads a first image for generating a color profile for the image forming apparatus, control the reading sensor to read the first image on a first sheet after causing the light source to emit light for a duration of a first time, and, in a case where the reading sensor reads a second image for detecting density unevenness in a main scanning direction in the image formed by the image forming apparatus, control the reading sensor to read the second image on a second sheet after causing the light source to emit light for a duration of a second time shorter than the first time.

According to another aspect of the embodiments, an image forming apparatus includes an image forming unit configured to form an image on a sheet, a conveyance roller configured to convey the sheet to a conveyance path, a light source configured to illuminate the image on the sheet while being moved in a predetermined direction above the sheet conveyed by the conveyance roller, the predetermined direction being different from a conveyance direction in which the sheet is conveyed by the conveyance roller, a reading sensor configured to read the image on the sheet while being moved in the predetermined direction above the sheet conveyed by the conveyance roller, and a controller configured to, in a case where a first image for generating a color profile for the image forming apparatus is formed on a first sheet by the image forming unit, control the reading sensor to read the first image on the first sheet after causing the light source to emit light for a duration of a first time, and, in a case where a second image for detecting density unevenness in a main scanning direction in the image formed by the image forming apparatus is formed on a second sheet by the image forming unit, control the reading sensor to read the second image on the second sheet after causing the light source to emit light for a duration of a second time shorter than the first time.

Further features of the disclosure will become apparent from the following description of exemplary embodiments with reference to the attached drawings.

DESCRIPTION OF THE EMBODIMENTS

Figure 1:
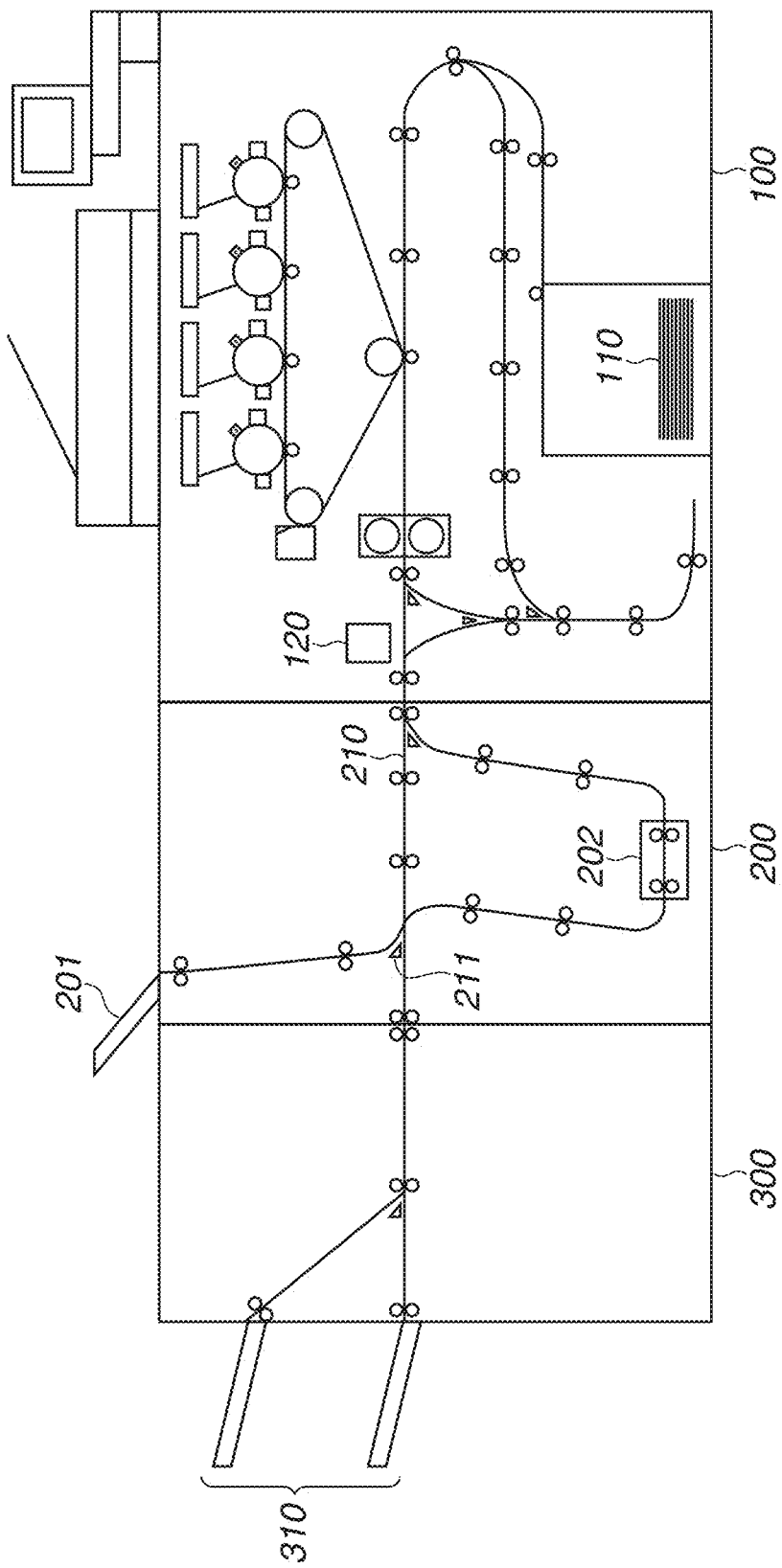
FIG. 1 is a schematic cross-sectional view of an image forming apparatus.

FIG. 1 is a schematic cross-sectional view of an image forming apparatus. The image forming apparatus includes a printer 100, which produces printed products, a measurement apparatus 200, which measures printed images using a sensor and performs various kinds of adjustment control, and a finisher 300, which performs a post-process (such as sorting processing and stapling processing) on sheets.

The printer 100 forms an image on a sheet based on image data read from an original document or image data received from a personal computer (PC) or other devices. The printer 100 includes photosensitive members, chargers, exposure devices, development devices, transfer devices, and a fixing device. In the printer 100, each charger charges the corresponding photosensitive member, the corresponding exposure device exposes the photosensitive member based on the image data to form an electrostatic latent image on the photosensitive member, and the corresponding development device develops the electrostatic latent image on the photosensitive member using toner. The toner image formed on the photosensitive member in that manner is transferred onto a sheet by the transfer device, and the toner image is fixed onto the sheet with the aid of heat of the heating device. The sheet with the toner image fixed thereon by the fixing device is discharged from the printer 100 and is fed to a conveyance path of the measurement apparatus 200 subsequent to the printer 100. A fan 120 is a load provided in the printer 100. The fan 120 receives power as the power source from a not-illustrated power source circuit, and cools down the sheet conveyed from the fixing device to the measurement apparatus 200.

The measurement apparatus 200 measures measurement images formed on sheets. The image forming apparatus makes the image adjustment of adjusting the density (or the color) of an image formed by the printer 100. The image forming apparatus causes the printer 100 to generate a chart corresponding to the type of image adjustment. The chart refers to a sheet on which a measurement image is formed. The printer 100 prints a main scanning shading chart by forming a measurement image for adjusting an uneven density of the image formed by the printer 100 on a sheet. Further, the printer 100 prints a color profile chart by forming a measurement image for adjusting the color of the image formed by the printer 100 on a sheet.

The measurement apparatus 200 conveys the sheet with the measurement image thereon as the chart toward the measurement position of a color measurement unit 202 by a flapper 210. The flapper 210 functions as a switching member to switch the destination to which the sheet is conveyed. The measurement apparatus 200 causes a flapper 211 to convey the chart toward a tray 201 after the chart passes through the measurement position of the color measurement unit 202. After that, the chart is discharged onto the tray 201.

On the other hand, when a sheet with no measurement image formed thereon is discharged from the printer 100, the measurement apparatus 200 causes the flappers 210 and 211 to convey the sheet toward the finisher 300 without conveying the sheet to the measurement position. The finisher 300 can perform the post-process specified by the user on the sheet discharged from the measurement apparatus 200. Examples of the post-process include a sorting process and a stapling process. The finisher 300 conveys the sheet subjected to the post-process toward a tray 310. If not performing any post-process on the sheet discharged from the measurement apparatus 200, the finisher 300 also conveys that sheet to the tray 310.

Figure 2:
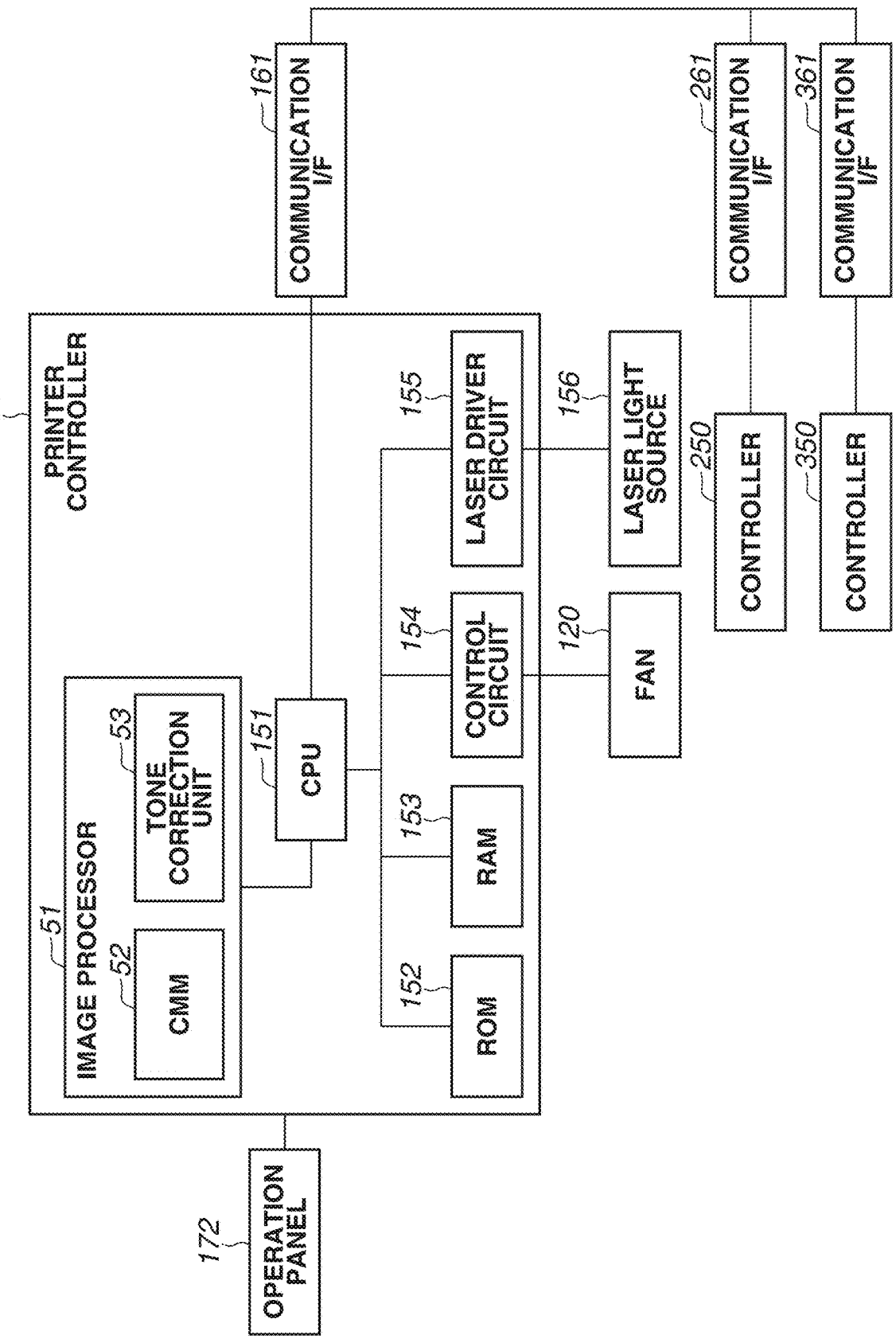
FIG. 2 is a control block diagram of the image forming apparatus.

FIG. 2 is a control block diagram of the image forming apparatus. A printer controller 150 controls each unit of the printer 100. Further, the printer controller 150 is communicable with an operation panel 172. The printer controller 150, for example, receives user specified information via the operation panel 172 and controls display on the operation panel 172. The printer controller 150 includes a central processing unit (CPU) 151, a read only memory (ROM) 152, a random access memory (RAM) 153, a control circuit 154, and a laser driver circuit 155. The CPU 151 executes a command based on a control program stored in the ROM 152. The control circuit 154 controls the rotation of the fan 120 based on instructions from the CPU 151. The laser driver circuit 155 controls a laser light source 156 of the exposure device to expose the photosensitive member. The printer 100 controls the intensity of laser light to which and the exposure time for which the laser light source 156 exposes the photosensitive member to thus adjust the attachment amount by which the toner is attached on the sheet, thereby controlling the density of the image formed on the sheet.

The CPU 151 is communicable with a controller 250 of the measurement apparatus 200 and a controller 350 of the finisher 300 via a communication interface (communication I/F) 161. Further, the CPU 151 can control power source supply to the measurement apparatus 200 and the finisher 300.

Further, the printer controller 150 includes an image processor 51. The image processor 51 includes a color management module (CMM) 52, which generates image data suited to the color space of the printer 100. The CMM 52, for example, converts image data dependent on the monitor (Red-Green-Blue (RGB) data) into image data in a color space independent of the device, and converts the image data in the color space independent of the device into image data in the color space of the printer 100 (Cyan-Magenta-Yellow-Black (CMYK) data). The CMM 52 converts the image data based on a color profile to convert the image data in the color space independent of the device into the image data in the color space of the printer 100 (the CMYK data). The color profile is, for example, a multidimensional conversion table that converts three-dimensional input values into the four-dimensional output values.

Further, the image processor 51 includes a tone correction unit 53, which converts the image data in such a manner that the tone characteristic (the density characteristic) of the image formed by the printer 100 matches an ideal tone characteristic. The tone correction unit 53 converts the image data generated by the CMM 52 based on the one-dimensional conversion table corresponding to a color component. The one-dimensional conversion table is referred to as a tone correction table. The printer controller 150 controls the laser driver circuit 155 based on the image data (the CMYK data) transferred from the image processor 51, thereby forming the image on the sheet.

The controller 250 controls sensors and loads (a conveyance roller, and the flappers 210 and 211) of the measurement apparatus 200, and communicates with the printer controller 150 via a communication interface (communication I/F) 261 and the controller 350 of the finisher 300.

The controller 350 controls loads (such as a conveyance roller, a punching unit, and a stapling unit) of the finisher 300, and communicates with the printer controller 150 and the controller 250 of the measurement apparatus 200 via a communication interface (communication I/F) 361.

Figure 3:
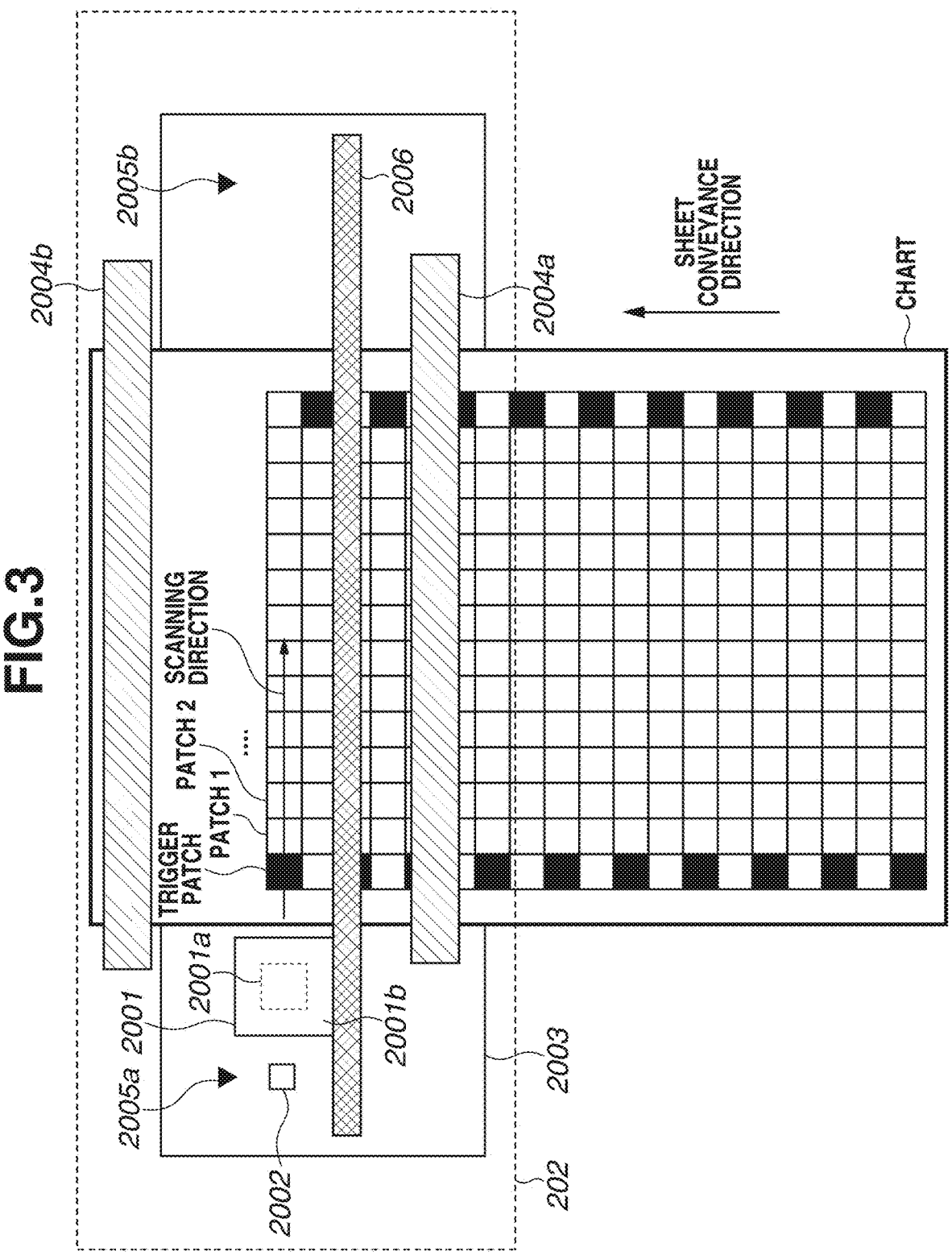
FIG. 3 schematically illustrates a chart conveyed to a color measurement sensor.

FIG. 3 illustrates the configuration of the color measurement unit 202.

The chart fed to the measurement apparatus 200 is conveyed toward the measurement position of the color measurement unit 202. A color measurement sensor 2001*a* is moved in the direction perpendicular to the sheet conveyance direction. The measurement position corresponds to the position on the conveyance path at which the color measurement sensor 2001*a* measures measurement images.

Figure 4:
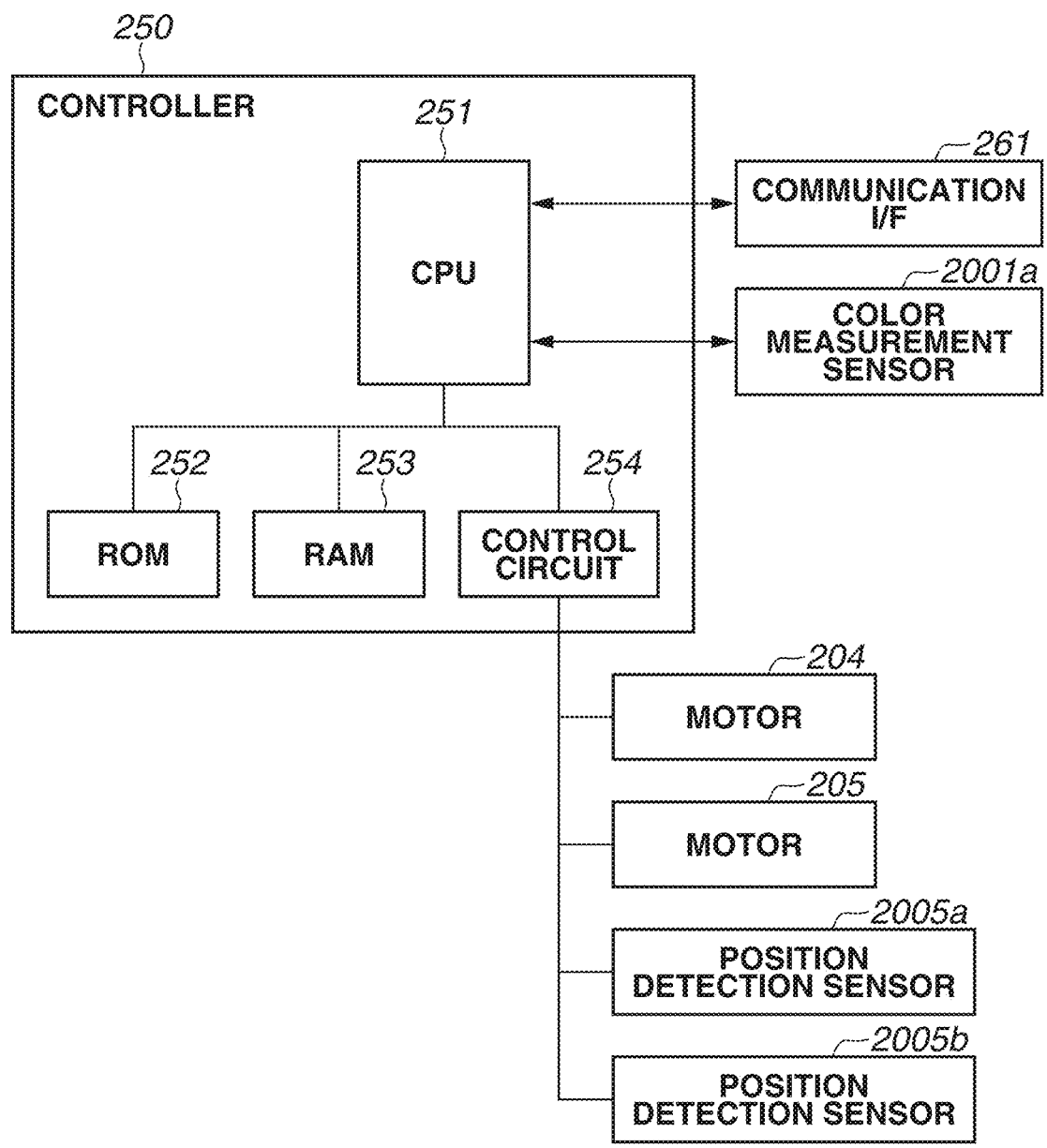
FIG. 4 is a control block diagram of a measurement apparatus.

The color measurement sensor 2001*a* is held by a color measurement sensor holder 2001*b*, and the color measurement sensor holder 2001*b* is coupled with a rail 2006 to move the color measurement sensor holder 2001*b* in the scanning direction. The color measurement sensor 2001*a* and the color measurement sensor holder 2001*b* will be collectively referred to as a color measurement carriage 2001. The color measurement carriage 2001 is moved on the rail 2006 by a motor 204 (FIG. 4).

When the chart reaches the measurement position, the color measurement carriage 2001 is retracted outside the region in which the chart is conveyed. More specifically, the color measurement carriage 2001 is located right above a reference member. The reference member is, for example, a white reference plate 2002 in white. The measurement apparatus 200 includes position detection sensors 2005a and 2005b to detect the position of the color measurement carriage 2001. The color measurement sensor 2001a is moved to right above the white reference plate 2002 by moving the color measurement carriage 2001 by a predetermined amount at a timing at which the color measurement carriage 2001 is detected by the position detection sensor 2005a.

The chart includes a large number of quadrilateral measurement images each with a predetermined size arranged in a two-dimensional layout. Further, the back side of the chart is supported by a backing member 2003.

The color measurement carriage 2001 in the color measurement operation and the operation of the chart conveyance control will be described.

The chart is stopped at a predetermined position in the color measurement unit 202 by conveyance rollers 2004a and 2004b. The measurement image first detected by the color measurement carriage 2001 is a trigger patch formed in one edge region in the direction perpendicular to the sheet conveyance direction. The timings of detecting the second measurement image and the measurement images subsequent thereto (Patch 1, Patch 2, and so on) are controlled based on the timing at which a trigger patch is detected. After ending measuring the measurement images in the first row, the color measurement carriage 2001 is moved until being detected by the position detection sensor 2005b. After the detection, the color measurement carriage 2001 is stopped.

After that, the measurement apparatus 200 conveys the chart by the conveyance rollers 2004a and 2004b in the sheet conveyance direction by the movement amount corresponding to the length of one row of measurement images. Then, the color measurement carriage 2001 measures the measurement images in the second row while being moved in the backward direction. While the color measurement sensor 2001a measures measurement images in odd-numbered rows, the color measurement carriage 2001 is moved in a first direction, which is the same as the measurement direction of the measurement images in the first row. On the other hand, while the color measurement sensor 2001a measures measurement images in even-numbered rows, the color measurement carriage 2001 is moved in a second direction, which is the same as the measurement direction of the measurement images in the second row.

FIG. 4 is a control block diagram of the measurement apparatus 200. The CPU 251 controls each unit of the measurement apparatus 200 based on programs stored in a ROM 252. A RAM 253 functions as a system work memory. A control circuit 254, for example, controls the motors 204 and 205 and acquires detection results from the position detection sensors 2005a and 2005b. Further, the CPU 251 is connected communicably with a CPU 24 (FIG. 5) of the color measurement sensor 2001a.

The motor 204 is the driving source to move the color measurement carriage 2001 along the rail 2006. The motor 205 is the driving source to drive the conveyance rollers 2004a and 2004b. The control circuit 254 also controls a not-illustrated motor to control each conveyance roller in the measurement apparatus 200, a semiconductor laser (SL), and photo sensors.

Figure 5:
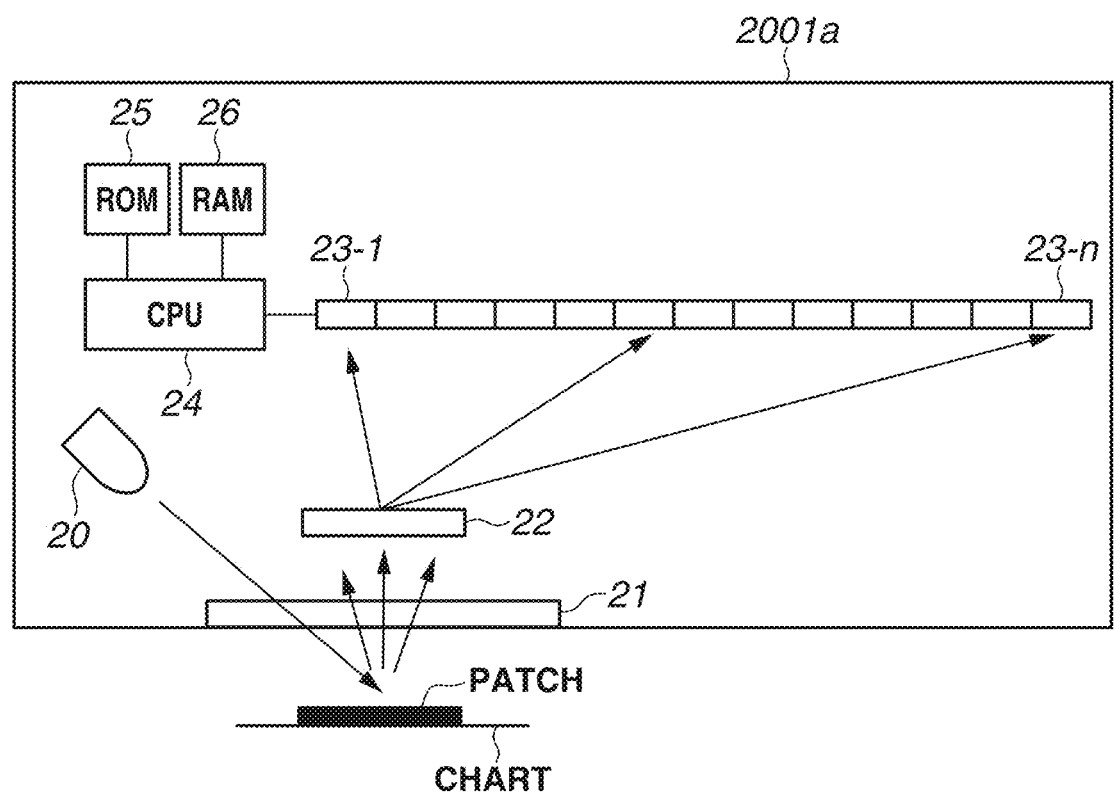
FIG. 5 is a cross-sectional view of the main portion of the color measurement sensor.

FIG. 5 illustrates the configuration of the color measurement sensor 2001a. The color measurement sensor 2001a is a spectroscopic sensor. The color measurement sensor 2001a includes a light source 20, which emits light, a light guide 21, which guides the light emitted from the light source 20 to the measurement image, a diffraction grating 22, which produces spectra from the light reflected off the measurement image, and a line sensor 23, which receives the spectra produced by the diffraction grating 22.

The light source 20 as a light emitting unit is, for example, a white light emitting diode (LED). The line sensor 23 is a light reception unit in which a plurality of pixels is arrayed in a predetermined direction. Each of the pixels outputs an output value based on the intensity of the received light. The value output from each of the pixels in the line sensor 23, which receives the spectra produced by the diffraction grating 22, is data indicating the intensity of the reflected light with the corresponding wavelength. The CPU 24 controls the light source 20 and the line sensor 23 based on programs stored in the ROM 25.

Figure 6A:
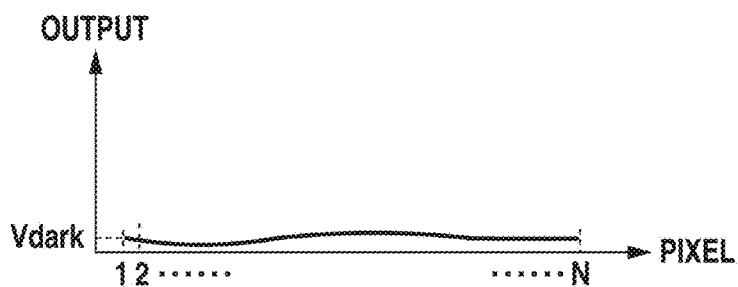
FIGS. 6A to 6E illustrate a sequence for generating the spectral reflectance of a measurement image.
Figure 6B:
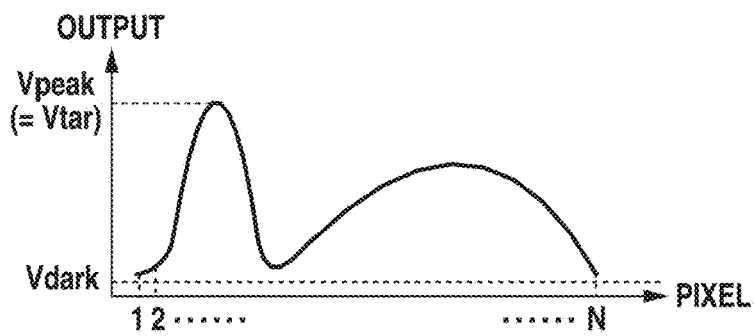

Further, the CPU 24 performs calculation processing based on the measurement data output from the line sensor 23 to determine the spectral reflectance of the measurement image. FIGS. 6A to 6E illustrate a calculation processing procedure for the spectral reflectance. The CPU 24 measures the dark voltage of the line sensor 23 before causing the light source 20 to emit light (FIG. 6A). Next, the CPU 24 measures the reflected light from the white reference plate 2002. The CPU 24 makes a light quantity adjustment of the light source 20 based on the result of the measurement of the white reference plate 2002. In the light quantity adjustment, the light quantity (the light emission intensity) of the light source 20 is adjusted in such a manner that the peak output value (Vpeak) of the line sensor 23 will become equal to the target value (Vtar) (FIG. 6B).

Figure 6C:
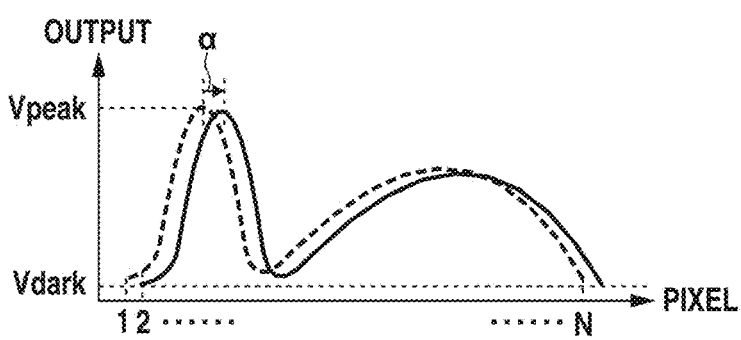
Figure 6D:
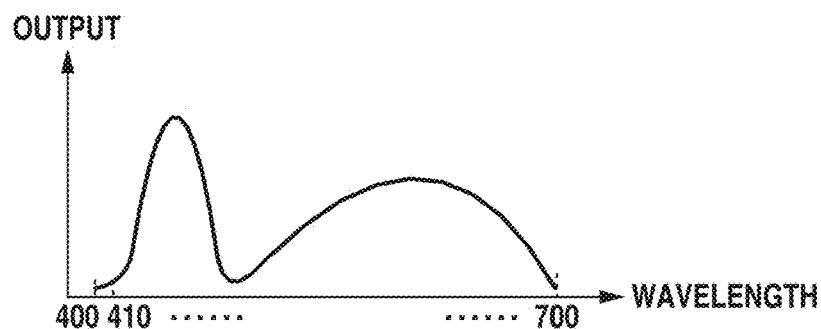
Figure 6E:
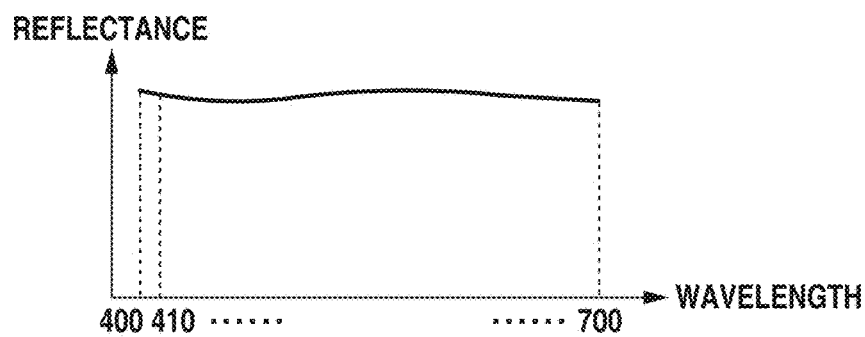

That adjustment is made for the purpose of correcting the variation in the output of the line sensor 23 due to the service life of the light source 20, stain on the window surface of the color measurement sensor 2001a, or stain on the white reference plate 2002. Next, the CPU 24 acquires the measurement data about the white reference plate 2002 with the adjusted light quantity (FIG. 6C), and determines the positional offset amount (a) of the light incident on the line sensor 23 based on the measurement data (FIG. 6C: a solid line). The positional offset amount (a) is calculated compared with the measurement data about the white reference plate 2002 measured when the color measurement sensor 2001a is shipped from the factory (FIG. 6C: a broken line). The measurement data about the white reference plate 2002 measured at the shipment from the factory will be referred to as initial data. The initial data is stored in the ROM 25 in advance. The CPU 24 corrects the corresponding relationship between the pixels of the line sensor 23 and the wavelength ranges based on the positional offset amount (a) (FIG. 6D). That correction will be referred to as a distortion correction. Further, the conversion of an output value for each pixel into an output value for the corresponding wavelength will be referred to as a pixel-wavelength conversion. After that, the CPU 24 measures the measurement image, and performs a dark voltage correction and pixel-wavelength conversion processing on the measurement data about the measurement image. Next, the CPU 24 calculates a spectral reflectance Rp of the measurement image based on the measurement data about the white reference plate 2002 and the measurement data about the measurement image (FIG. 6E). That is the operation procedure of the color measurement sensor 2001a for measuring the measurement image.

Next, influence imposed by heat generation of the light source 20 will be described Immediately after the light source 20 starts the light emission, the temperature of the light source 20 precipitously increases. It is known that the heat of the LED changes the light emission spectrum and the light emission quantity even with the current kept constant as a characteristic of LEDs. To prevent that, the light source 20 is caused to emit light in advance of the measurement of the white reference plate 2002. The temperature of the light source 20 increases with the light emission by the light source 20. It is suitable that the light source 20 at that timing is caused to emit light with a light emission quantity greater than the light emission quantity applied in measurement of measurement images. That will be referred to as preliminary light emission. Next, an effect of the preliminary light emission will be described.

Figure 7A:
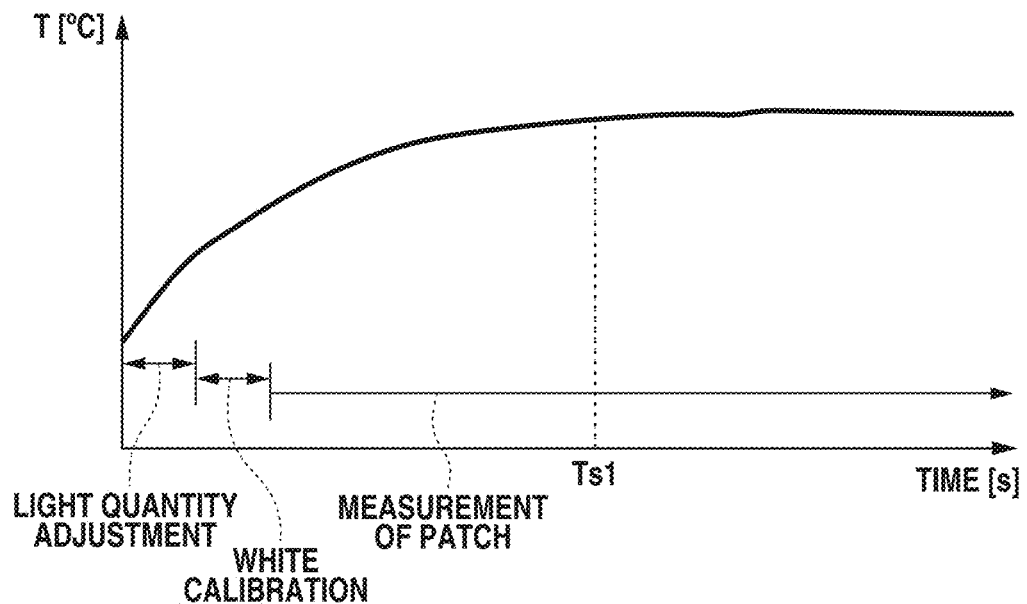
FIGS. 7A and 7B illustrate a temperature transition of the color measurement sensor.

FIG. 7A illustrates a temperature transition with no preliminary light emission of the light source 20 from the start of the light quantity adjustment until the measurement of the measurement image. Ts1 represents the time when the temperature of the light source 20 becomes stable. Further, the white calibration written in this drawing indicates the above-described processing of acquiring the measurement data about the white reference plate 2002 and distortion correction. As illustrated in FIG. 7A, while the white calibration and the measurement of the measurement image are conducted, the temperature of the light source 20 is instable, causing change in the light emission spectrum and the light emission quantity of the light source 20. That results in decrease in the measurement accuracy of the color measurement sensor 2001a. To prevent that, it is suitable that the white calibration is carried out after Ts1, at which the temperature becomes stable at approximately a saturation temperature. However, with no preliminary light emission carried out, the white calibration is not carried out until Ts1, causing a longer time taken from the start of the light quantity adjustment to the measurement of the measurement image.

Figure 7B:
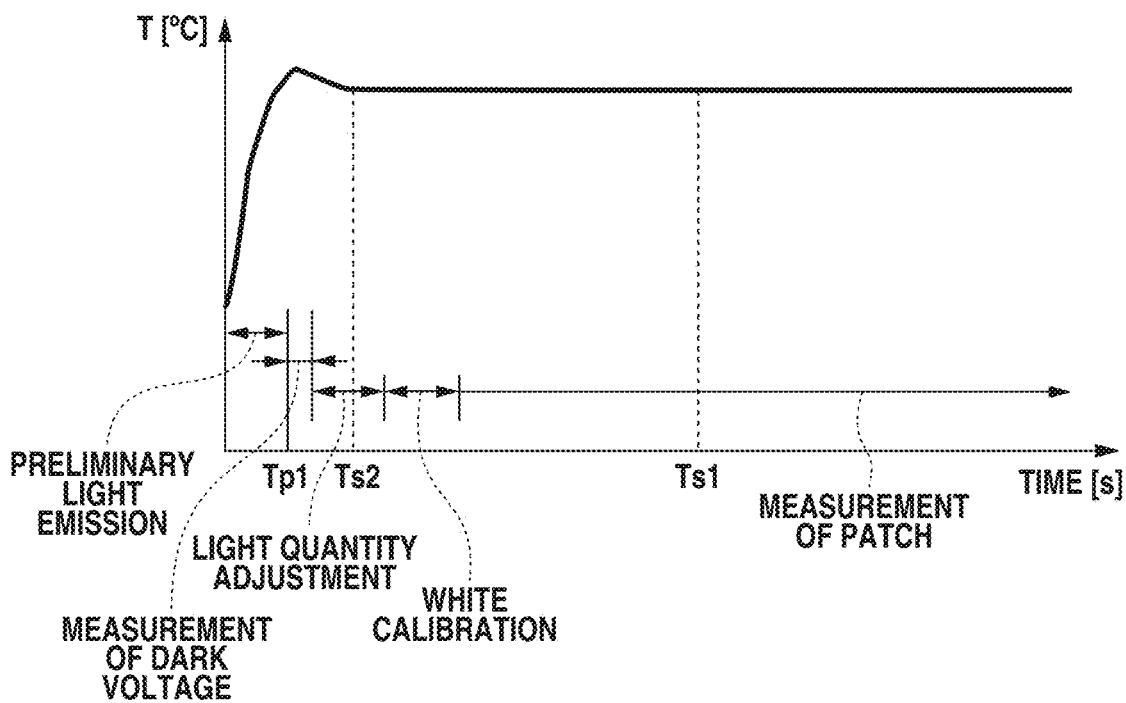

FIG. 7B illustrates a temperature transition with the preliminary light emission of the light source 20 from the start of the preliminary light emission until the measurement of the measurement image. Tp1 and Ts2 illustrated in FIG. 7B represent the time taken for the preliminary light emission (a preliminary light emission time) and the time when the temperature of the light source 20 becomes stable, respectively. With the preliminary light emission, the time Ts2 taken from the start of the light emission by the light source 20 until the temperature of the light source 20 becomes stable at approximately a saturation temperature is extremely shorter compared to the time Ts1 taken with no preliminary light emission. Further, Ts2 is a time before the white calibration is carried out, allowing the light emission spectrum and the light emission quantity of the light source 20 to be stable during the white calibration and the measurement of the measurement image. That allows the measurement sensor 2001a to make the measurement with high accuracy. Carrying out the preliminary light emission in that manner allows the heat of the light source 20 to become stable at the saturation temperature in a short time, thereby contributing to reducing the time taken for the image adjustment. That is a description of the effect of the preliminary light emission operation.

Now, the image forming apparatus discussed in United States Patent Publication Application No. 2017/0176884 switches the time taken for the preliminary light emission based on whether the tone characteristics adjustment has been made in advance. More specifically, the image forming apparatus discussed in United States Patent Publication Application No. 2017/0176884 causes the light emitting unit to emit light for 5 seconds before a mixed-color correction is started if a tone characteristics adjustment has been made in advance and causes the light emitting unit to emit light for 20 seconds before a mixed-color correction is started if no tone characteristics adjustment has been made in advance. That is because, if a tone characteristics adjustment has been made in advance, a preliminary light emission has already been carried out for 20 seconds before a tone characteristics adjustment is made, whereby the temperature of the sensor is in an increased state.

However, the image forming apparatus discussed in United States Patent Publication Application No. 2017/0176884 causes the light emitting unit to emit light for the same predetermined time whether a tone characteristics adjustment alone is made or a mixed-color correction alone is made. For that reason, the image forming apparatus discussed in United States Patent Publication Application No. 2017/0176884 has a problem of an increase in the time taken from an instruction issued to carry out the calibration through the completion of measurement of a measurement image (a downtime).

In the following description, image adjustment modes in the image forming apparatus discussed herein will be described. The image forming apparatus can perform a plurality of image adjustment modes including color profile generation control and main scanning shading adjustment.
(Color Profile Generation Control)

Figures 8A, 8B:
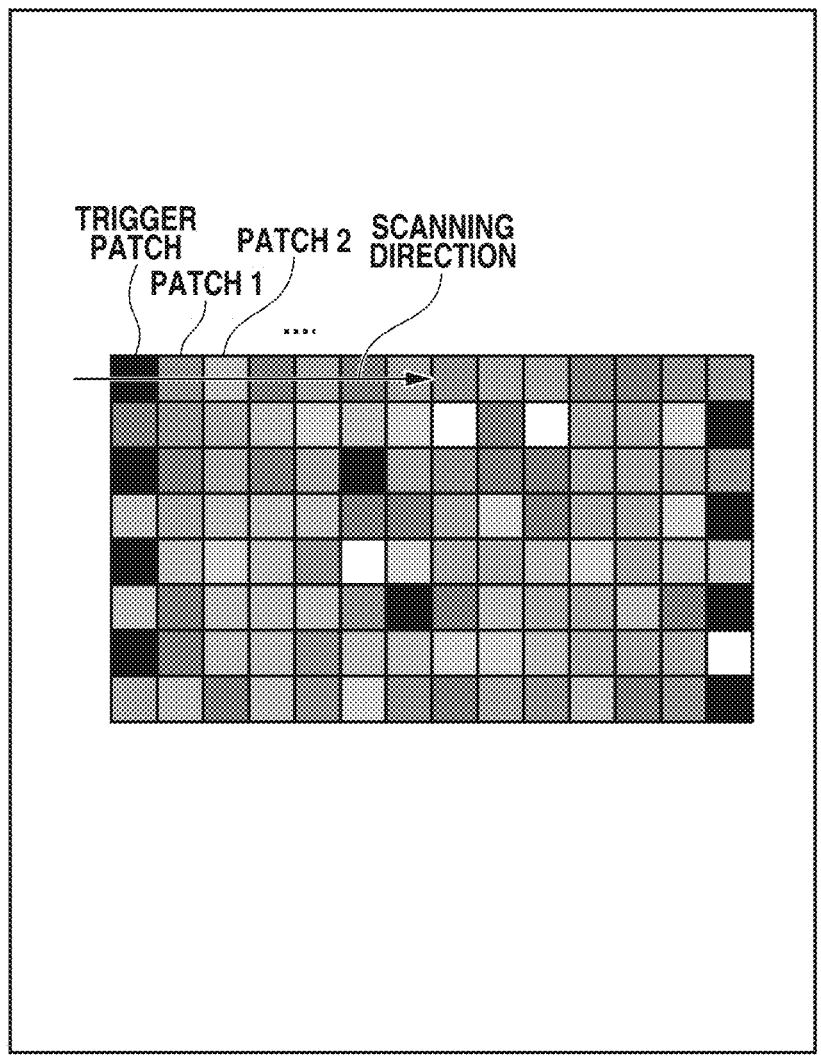
FIGS. 8A and 8B schematically illustrates a color profile generation chart.

FIG. 8A schematically illustrates a color profile generation chart. The color profile generation chart includes measurement images in 1617 colors prescribed in International Organization for Standardization (ISO) 12642-2. The present chart includes measurement images in mixed colors. A measurement image in a mixed color is formed with variations in the density of each color component (cyan, magenta, yellow, and black) in various manners by the printer 100. The CPU 24 controls the color measurement sensor 2001a to measure each of the measurement images, calculates the spectral reflectance for each measurement image, and generates spectroscopic data about each of the measurement images (for example, L*a*b* values) based on the spectral reflectance. A CMYK-L*a*b* table in FIG. 8B indicates the relationship between the composition of the color components in each of the measurement images and the spectroscopic data about the measurement image (the result of the actual measurement). The L*a*b* values are values indicating coordinates in the color space formulated by the International Commission on Illumination. L* represents lightness of a color, a* represents a position between magenta and green, and b* represents a position between yellow and blue.

The CPU 151 generates a CMYK-L*a*b* conversion table based on the spectroscopic data (the result of the actual measurement) about the color profile generation chart. The CPU 151 generates a color profile from the result of the measurement of the color profile generation chart by referring to the corresponding relationship between the color space data independent of the device and the L*a*b* values. The CMM 52 converts the input image data into image data in the color space independent of the device, and converts the converted image data into image data in the color space of the printer 100 (the CMYK data) based on the color profile. The CMM 52 converts the data from the source color space into the color space of the printer 100, by which the printer 100 provides high color reproducibility.

(Main Scanning Shading Adjustment)

The main scanning shading adjustment is control of correcting density unevenness over the entire main scanning region.

Figure 9:
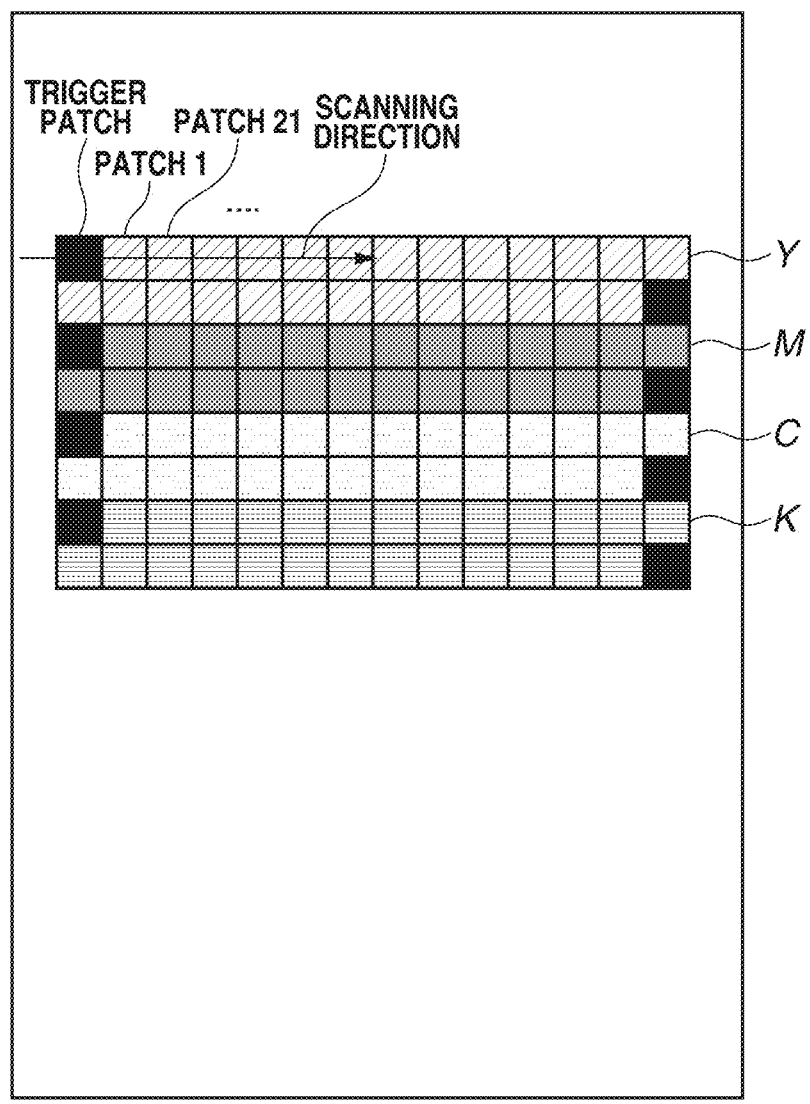
FIG. 9 schematically illustrates a main scanning shading chart.

FIG. 9 schematically illustrates a shading chart for correcting the density in the main scanning direction. The shading chart includes a plurality of band images (measurement images) formed for each color component. The shading chart does not include any measurement image in a mixed color, and is formed of band images (measurement images) each in a single color. The band images each formed in a single color are a yellow band image, a magenta band image, a cyan band image, and a black band image. The shading chart is divided into a plurality of areas to be measured in the direction perpendicular to the sheet conveyance direction (the main scanning direction). The number of areas in the main scanning direction is, for example, 23 areas. The density of each of the areas is, for example, a value calculated by acquiring densities based on spectral reflectances at 10 measurement points in one area and averaging the 10 measured densities. Further, the color measurement sensor 2001*a* scans band images in the same color formed at different positions in the sheet conveyance direction. More specifically, the color measurement sensor 2001*a* scans a band image in a predetermined color that is formed nearer the leading edge of the sheet while being moved from the left to the right in FIG. 9, and scans a band image in the predetermined color that is formed nearer the trailing edge of the sheet while being moved from the right to the left in FIG. 9. The CPU 151 determines the density of the same area in the main scanning direction by averaging the measured densities acquired by scanning it twice. Further, trigger patches for controlling the timing of each scan are formed in the shading chart. The CPU 151 determines the density value based on the measured densities of the band image excluding the trigger patches in an area containing the trigger patches on both ends.

The CPU 151 calculates the average density by adding up the individual densities of the areas in the main scanning direction and dividing the result of the addition by the number of areas, and further calculates differences $\Delta d1$, $\Delta d2$, ... and $\Delta d23$ between the average density and the density of each area. The CPU 151 corrects the density unevenness in the main scanning direction by adjusting the intensity of the laser light of the laser light source 156 area by area based on the density differences $\Delta d1$, $\Delta d2$, ... and $\Delta d23$.

(Adjustment of Preliminary Light Emission Time)

The number of types of measurement images formed on one sheet in the color profile generation control is greater than that in the main scanning shading adjustment. Further, the region where the measurement images are formed on one sheet in the main scanning shading adjustment has a shorter length in the sheet conveyance direction than that in the color profile generation control. Thus, it takes a longer time until the end of the measurement of all the measurement images formed on one sheet in the color profile generation control than the time taken in the main scanning shading adjustment.

Further, the main scanning shading adjustment can work as long as the density unevenness in the main scanning direction can be detected, and thus can be achieved with the relative differences in the density between the areas in the main scanning direction determined even when the light emission spectrum and the light emission quantity somewhat fluctuate. On the other hand, the color profile generation control involves the detection of the color of the measurement image, which will provide a higher accuracy correction if the fluctuation in the light emission spectrum and the light emission quantity is reduced.

The preliminary light emission works as long as the measurement accuracy of the color measurement sensor 2001*a* suited to each image adjustment mode is sufficient during the period until the completion of the measurement of all the measurement images. Thus, the image forming apparatus sets the time taken for the preliminary light emission (the preliminary light emission time) for the main scanning shading adjustment and the time taken for the preliminary light emission for the color profile generation control, which are different from each other. More specifically, the preliminary light emission time taken in the main scanning shading adjustment is set shorter than that taken in the color profile generation control. That settings optimizes the time taken for the image adjustment.

The color profile generation control takes Tp1 as the preliminary light emission time, as indicated in FIG. 7B. Tp1 is 60 seconds based on experiments by the present inventor(s). The preliminary light emission time lasting for 60 seconds allows the white calibration to be carried out with the temperature of the light source 20 close to the saturation temperature. For that reason, the CPU 151 controls the light source 20 to emit light for 60 seconds (a first preliminary light emission time) in the preliminary light emission in the color profile generation control before the chart reaches the measurement position. Then, after the first preliminary light emission time, the processing proceeds to the white calibration. After the first preliminary light emission time has elapsed, the light source 20 may be turned off for a moment, or the processing may proceed to the white calibration with the light source 20 kept turned on.

On the other hand, the main scanning shading adjustment takes Tp2 as the preliminary light emission time. Tp2 is 30 seconds based on experiments by the present inventor(s). The preliminary light emission time lasting for 30 seconds allows the temperature of the light source 20 to increase to a temperature lower than the saturation temperature. As a result, in the main scanning shading adjustment, although the temperature increases during the white calibration and the measurement of the measurement images, the measurement accuracy for the main scanning shading adjustment stays sufficient. The CPU 151 controls the light source 20 to emit light for 30 seconds (a second preliminary light emission time) for the preliminary light emission in the main scanning shading adjustment before the chart reaches the measurement position. After the second preliminary light emission time, the processing proceeds to the white calibration. After the second preliminary light emission time has elapsed, the light source 20 may be turned off for a moment, or the processing may proceed to the white calibration with the light source 20 kept on.

Figure 10:
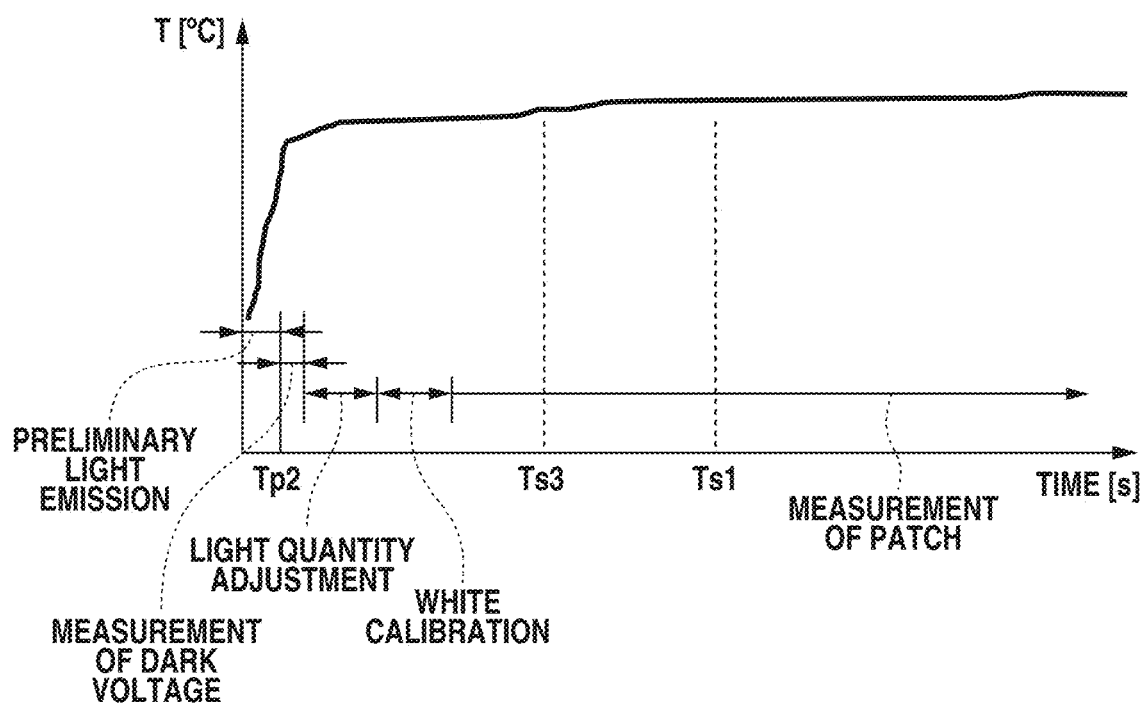
FIG. 10 illustrates a temperature transition of the color measurement sensor.

FIG. 10 illustrates a temperature transition of the light source 20 with the preliminary light emission time Tp2 set at 30 seconds. As the preliminary light emission time is shortened from 60 seconds to 30 seconds, Ts3 is taken as the time from the start of the preliminary light emission until the saturation of the temperature. Thus, the temperature is in a state not saturated yet during the white calibration and the measurement of the measurement images. However, the temperature exhibits gentle change after Tp2 has elapsed due to the execution of the preliminary light emission. Thus, the measurement accuracy can be sufficient in the main scanning shading adjustment.

Figure 11:
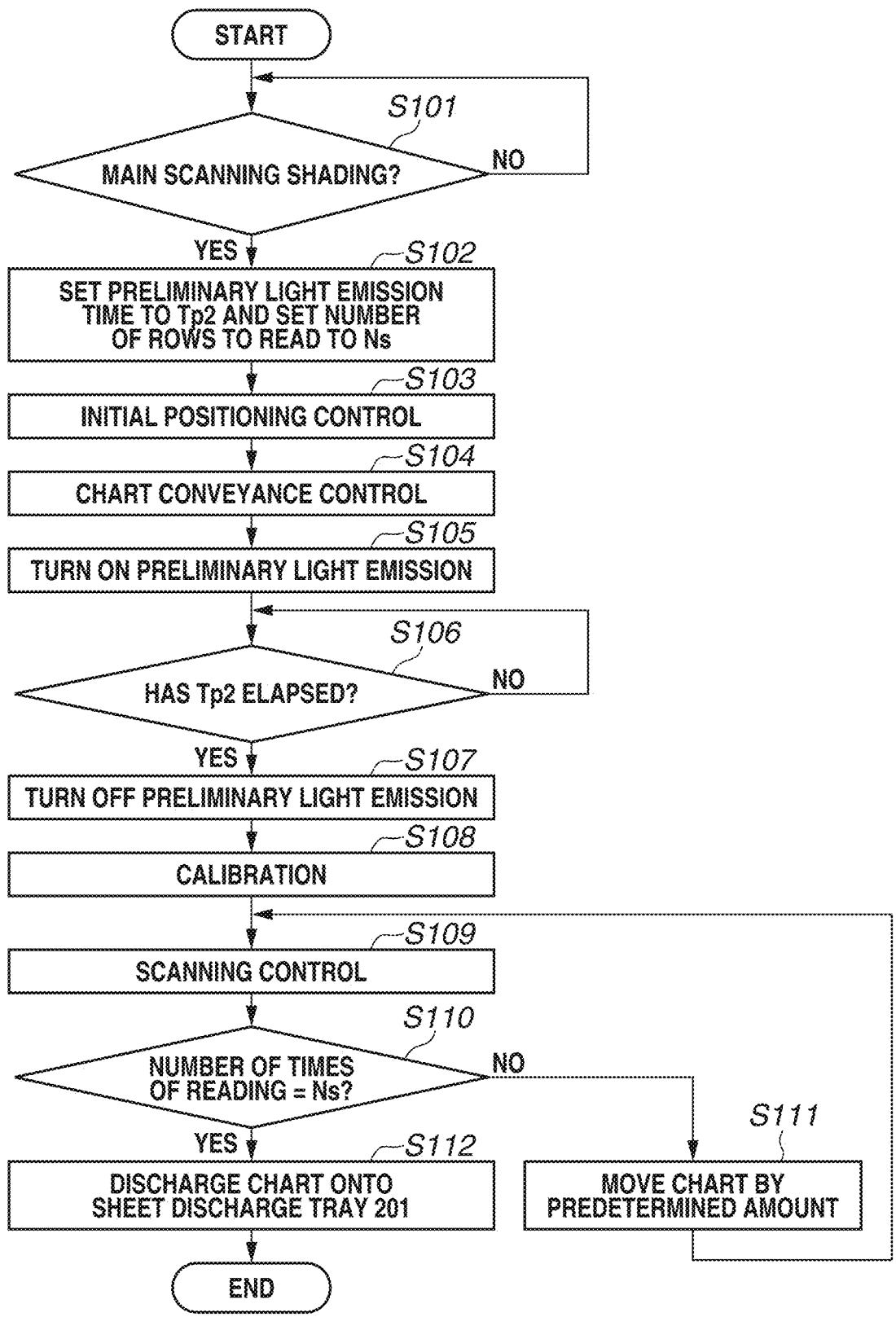
FIG. 11 is a flowchart illustrating a measurement sequence.

Next, the operation procedure of the actual color measurement control will be described with reference to FIG. 11. FIG. 11 illustrates the operation procedure of the CPU 251 for the main scanning shading adjustment. In step S101, a main scanning shading control instruction is issued by the user via the operation panel 172 of the printer 100 or the not-illustrated PC. Next, in step S102, the preliminary light emission time is set to Tp2 (30 seconds) and the number of times the color measurement carriage 2001 scans is set to Ns. Now, Ns represents the number of main scanning patch rows in the chart. A patch layout is typically registered with the printer 100 for each sheet size. That means that Ns should be variable based on the size of the chart. Next, in step S103, the CPU 251 performs initial positioning control of the color measurement carriage 2001. The initial positioning control is performed by locating the current position of the color measurement carriage 2001 based on signal outputs from the position detection sensors 2005a and 2005b. In response to a detection of the position detection sensor 2005a, the color measurement carriage 2001 is moved in the direction of the position detection sensor 2005b until the position detection sensor 2005a is not detected. After that, the motor 204 is rotated in the backward direction, and the position detection sensor 2005a is detected again, and is stopped after being moved by a predetermined movement amount. This operation allows the color measurement carriage 2001 to be moved to right above the white reference plate 2002. Next, the chart is output by the printer 100. In step S104, the CPU 251 conveys the chart as far as the predetermined position of the color measurement unit 202 in the measurement apparatus 200. Next, in step S105, the CPU 251 starts the preliminary light emission of the color measurement sensor 2001a. In step S106, the CPU 251 determines whether the preliminary light emission time reaches the target time Tp2. If the preliminary light emission time reaches the target time Tp2 (YES in step S106), in step S107, the CPU 251 stops the preliminary light emission. Next, in step S108, the CPU 251 performs the calibration operation of the color measurement sensor 2001a. The dark current correction, the light quantity correction, and the distortion correction are made in the calibration operation. Next, in step S109, the CPU 251 performs scanning control. The scanning control refers to an operation of driving the color measurement carriage 2001 and reading the measurement images corresponding to one patch row on the chart in the main scanning direction. After ending the scanning control corresponding to one row, in step S110, the CPU 251 determines whether the number of times of scanning reaches the target number of times Ns. If the number of times of scanning is smaller than the target number of times Ns (NO in step S110), in step S111, the CPU 251 conveys the chart by a distance corresponding to the size of the patch in the sub-scanning direction. Then, the CPU 251 preforms the scanning control again. If the number of times of scanning is equal to the target number of times Ns in step S110 (YES in step S110), the CPU 251 discharges the chart onto the tray 201 and ends the color measurement control for the main scanning shading adjustment. That is the operation procedure of the CPU 251 for the main scanning shading adjustment. The result of performing the reading operation in the present procedure is transmitted to the printer 100, and the density adjustment is made.

Next, the operation procedure of the color profile generation control will be described. The change made in the color profile generation control is the settings of the preliminary light emission time and the number of rows to read in step S102 in the operation procedure of the main scanning shading adjustment, and the color profile generation control is performed in the same operation procedure as the main scanning shading adjustment except for those. In the color profile generation control, the preliminary light emission time and the number of rows to read are set to Tp1 and Np, respectively. The preliminary light emission time and the number of rows to read are set to Tp1>Tp2 and Np>Ns.

In the color profile generation control, the reading result is also transmitted to the printer 100, and the color profile is generated. That is the operation procedure of the color measurement control operation.

According to the image reading apparatus or the image forming apparatus discussed herein, the preliminary light emission suited to the type of calibration prevents the time for the preliminary light emission from excessively increasing.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-203548, filed Dec. 8, 2020, which is hereby incorporated by reference herein in its entirety.

What is claimed is:

1. An image reading apparatus configured to read an image on a sheet discharged from an image forming apparatus, the image reading apparatus comprising:
   a conveyance roller configured to convey the sheet to a conveyance path;
   a light source configured to illuminate the image on the sheet while being moved in a predetermined direction above the sheet conveyed by the conveyance roller, the predetermined direction being different from a conveyance direction in which the sheet is conveyed by the conveyance roller;
   a reading sensor configured to read the image on the sheet while being moved in the predetermined direction above the sheet conveyed by the conveyance roller; and
   a controller configured to,
      in a case where the reading sensor reads a first image for generating a color profile for the image forming apparatus, control the reading sensor to read the first image on a first sheet after causing the light source to emit light for a duration of a first time, and,
      in a case where the reading sensor reads a second image for detecting density unevenness in a main scanning direction in the image formed by the image forming apparatus, control the reading sensor to read the second image on a second sheet after causing the light source to emit light for a duration of a second time shorter than the first time.

2. The image reading apparatus according to claim 1,
   wherein the light source illuminates a first region on the image while being moved above the sheet in the predetermined direction with a stopped conveyance,
   wherein the reading sensor reads the first region on the image while being moved above the sheet in the predetermined direction with the stopped conveyance,
   wherein the conveyance unit conveys the sheet to allow a second region in the image to be read after the first region is read, the second region being different from the first region on the sheet in the conveyance direction, wherein the light source illuminates the second region on the image while being moved above the sheet in the predetermined direction with the stopped conveyance, and wherein the reading sensor reads the second region on the image while being moved above the sheet in the predetermined direction with the stopped conveyance.

3. The image reading apparatus according to claim 1, wherein the first image includes an image in a mixed color using cyan, magenta, yellow, and/or black, and wherein the second image includes a cyan image, a magenta image, a yellow image, and a black image.

4. The image reading apparatus according to claim 1, wherein the first image includes images in different colors that are formed at different positions in the predetermined direction on the first sheet, and wherein the second image includes a band image in a predetermined color, a longitudinal direction of the band image being different from the conveyance direction.

5. The image reading apparatus according to claim 1, wherein the first image includes images in different colors, wherein the second image includes images in different colors, and wherein a number of colors in the images included in the second image is smaller than the number of colors in the images included in the first image.

6. The image reading apparatus according to claim 1, further comprising a carriage configured to be moved in the predetermined direction, wherein the carriage includes the light source and the reading sensor.

7. The image reading apparatus according to claim 1, further comprising a reference member, wherein the controller controls the light source to illuminate the reference member, controls the reading sensor to read the reference member, and controls a light emission intensity of the light source based on a result of reading the reference member by the reading sensor.

8. The image reading apparatus according to claim 1, wherein, in a case where the reading sensor reads the first image, the light source emits the light for the duration of the first time outside a region through which the sheet passes in the predetermined direction, and wherein, in a case where the reading sensor reads the second image, the light source emits the light for the duration of the second time outside the region through which the sheet passes in the predetermined direction.

9. The image reading apparatus according to claim 1, wherein the reading sensor includes a diffraction grating configured to produce spectra from reflected light off the image, and a light reception unit including pixels configured to receive the spectra produced by the diffraction grating.

10. The image reading apparatus according to claim 1, further comprising a tray onto which the sheet is discharged.

11. An image forming apparatus comprising:
an image forming unit configured to form an image on a sheet;
a conveyance roller configured to convey the sheet to a conveyance path;
a light source configured to illuminate the image on the sheet while being moved in a predetermined direction above the sheet conveyed by the conveyance roller, the predetermined direction being different from a conveyance direction in which the sheet is conveyed by the conveyance roller;
a reading sensor configured to read the image on the sheet while being moved in the predetermined direction above the sheet conveyed by the conveyance roller; and
a controller configured to,
in a case where a first image for generating a color profile for the image forming apparatus is formed on a first sheet by the image forming unit, control the reading sensor to read the first image on the first sheet after causing the light source to emit light for a duration of a first time, and
in a case where a second image for detecting density unevenness in a main scanning direction in the image formed by the image forming apparatus is formed on a second sheet by the image forming unit, control the reading sensor to read the second image on the second sheet after causing the light source to emit light for a duration of a second time shorter than the first time.

12. The image forming apparatus according to claim 11, wherein the light source illuminates a first region on the image while being moved above the sheet in the predetermined direction with a stopped conveyance, wherein the reading sensor reads the first region on the image while being moved above the sheet in the predetermined direction with the stopped conveyance, wherein the conveyance unit conveys the sheet to allow a second region in the image to be read after the first region is read by the reading sensor, the second region being different from the first region on the sheet in the conveyance direction, wherein the light source illuminates the second region on the image while being moved above the sheet in the predetermined direction with the stopped conveyance, and wherein the reading sensor reads the second region on the image while being moved above the sheet in the predetermined direction with the stopped conveyance.

13. The image forming apparatus according to claim 11, wherein the first image includes an image in a mixed color using cyan, magenta, yellow, and/or black, and wherein the second image includes a cyan image, a magenta image, a yellow image, and a black image.

14. The image forming apparatus according to claim 11, wherein the first image includes images in different colors that are formed at different positions in the predetermined direction on the first sheet, and wherein the second image includes a band image in a predetermined color, a longitudinal direction of the band image being different from the conveyance direction.

15. The image forming apparatus according to claim 11, wherein the first image includes images in different colors, wherein the second image includes images in different colors, and wherein a number of colors in the images included in the second image is smaller than the number of colors in the images included in the first image.

16. The image forming apparatus according to claim 11, further comprising a carriage configured to be moved in the predetermined direction, wherein the carriage includes the light source and the reading sensor.

17. The image forming apparatus according to claim 11, further comprising a reference member, wherein the controller controls the light source to illuminate the reference member, controls the reading sensor to read the reference member, and controls a light emission intensity of the light source based on a result of reading the reference member by the reading sensor.

18. The image forming apparatus according to claim 11, wherein, in a case where the reading sensor reads the first image, the light source emits the light for the duration of the first time outside a region in the predetermined direction, the region through which the sheet passes, and wherein, in a case where the reading sensor reads the second image, the light source emits the light for the duration of the second time outside the region in the predetermined direction, the region through which the sheet passes.

19. The image forming apparatus according to claim 11, wherein the reading sensor includes a diffraction grating configured to produce spectra from reflected light off the image, and a light reception unit including pixels configured to receive the spectra produced by the diffraction grating.

20. The forming apparatus according to claim 11, further comprising a tray onto which the sheet is discharged.

* * * * *